United States Patent
Matras

(10) Patent No.: US 11,472,274 B2
(45) Date of Patent: Oct. 18, 2022

(54) MAGNETIC SOFT TOP ASSEMBLY

(71) Applicant: Elements Automotive, LLC, Abilene, TX (US)

(72) Inventor: Michael S. Matras, Abilene, TX (US)

(73) Assignee: Elements Automotive, LLC, Abilene, TX (US)

( * ) Notice: Subject to any disclaimer, the term of this patent is extended or adjusted under 35 U.S.C. 154(b) by 65 days.

(21) Appl. No.: 17/064,167

(22) Filed: Oct. 6, 2020

(65) Prior Publication Data

US 2021/0086598 A1    Mar. 25, 2021

Related U.S. Application Data

(63) Continuation of application No. 16/402,439, filed on May 3, 2019, now Pat. No. 10,919,370.

(60) Provisional application No. 62/668,913, filed on May 9, 2018.

(51) Int. Cl.
*B60J 7/10* (2006.01)
*B60J 7/185* (2006.01)

(52) U.S. Cl.
CPC ............. *B60J 7/104* (2013.01); *B60J 7/1858* (2013.01)

(58) Field of Classification Search
CPC ...... B60J 7/104; B60J 7/1858; B60R 21/2338
USPC .................................................. 296/100.18
See application file for complete search history.

(56) References Cited

U.S. PATENT DOCUMENTS

| | | | | |
|---|---|---|---|---|
| 5,385,377 A * | 1/1995 | Girard | ...................... | B60J 7/104 296/108 |
| 5,687,895 A * | 11/1997 | Allison | ...................... | B60R 7/02 224/404 |
| 5,758,922 A * | 6/1998 | Wheatley | ................. | B60J 7/104 160/368.1 |
| 6,286,888 B1 * | 9/2001 | Essig | ....................... | B60J 7/104 160/382 |
| 6,827,391 B1 * | 12/2004 | Kohn | ......................... | B60J 7/10 296/146.14 |
| 7,100,961 B2 * | 9/2006 | Moen | ........................ | B60J 7/102 135/88.13 |
| 7,438,338 B1 * | 10/2008 | Schumacher | ............. | B60R 9/06 222/404 |
| 7,523,977 B2 * | 4/2009 | Fallis, III | ............... | B60J 7/0053 296/107.09 |
| 7,621,591 B2 * | 11/2009 | Arellano | ............. | B60R 13/0206 296/214 |

(Continued)

*Primary Examiner* — Pinel E Romain
(74) *Attorney, Agent, or Firm* — John J. Patti; Patti Pershern, PLLC

(57) ABSTRACT

An apparatus is provided. The apparatus comprises a forward magnetic assembly that is formed along the forward edge of the main body. The forward magnetic assembly includes: (1) a reinforcement that is secured to the main body along at least a portion of the forward edge; (2) a first magnet that is secured to the main body along at least a portion of the forward edge of the main body and positioned to be substantially adjacent to the third reinforcement, where the first magnets is dimensioned such that first magnet, as secured to the main body, is configured to form an interference fit within a gap of a forward assembly of a vehicle; and (3) a fourth reinforcement that is formed along at least a portion of the forward edge of the main body, where the fourth reinforcement is positioned to be substantially adjacent to the first magnet.

18 Claims, 11 Drawing Sheets

(56) References Cited

U.S. PATENT DOCUMENTS

| | | | | |
|---|---|---|---|---|
| 7,828,364 B2* | 11/2010 | Causey | .................... | B60J 7/102 |
| | | | | 296/136.12 |
| 8,002,331 B2* | 8/2011 | Bowers | ................ | B60N 2/3013 |
| | | | | 296/65.01 |
| 8,061,758 B2* | 11/2011 | Maimin | .................... | B60J 7/141 |
| | | | | 296/100.09 |
| 8,430,441 B2* | 4/2013 | Waterman | ................ | B60R 13/01 |
| | | | | 296/183.1 |
| 8,540,792 B2* | 9/2013 | Crook | ................ | B01D 46/0004 |
| | | | | 55/480 |
| 8,857,887 B1* | 10/2014 | Schmeichel | ........... | B62D 27/06 |
| | | | | 296/100.18 |
| 9,815,356 B2* | 11/2017 | Haberkamp | ............. | B60J 10/15 |
| 9,868,342 B2* | 1/2018 | Xu | ........................... | B60J 7/085 |
| 10,124,655 B2* | 11/2018 | Langevin | ................ | B60J 7/061 |
| 10,315,581 B2* | 6/2019 | Xiong | .................... | B60R 5/045 |
| 10,457,126 B2 | 10/2019 | Held | | |
| 10,583,724 B2* | 3/2020 | Lovasz | .................. | B60J 7/1851 |
| 10,787,067 B2* | 9/2020 | Nania | ...................... | B60J 7/085 |
| 10,787,131 B2* | 9/2020 | Marchlewski | ............ | B60R 9/04 |

* cited by examiner

MAGNETIC SOFT TOP ASSEMBLY

CROSS-REFERENCE

This application is a continuation of U.S. patent application Ser. No. 16/402,439 (now U.S. Pat. No. 10,919,370) filed on May 3, 2019, which claims priority to U.S. Provisional Patent Application Ser. No. 62/668,913, which was filed on May 9, 2018, and which was entitled "MAGNETIC SOFTTOP ASSEMBLY." Each application is hereby incorporated by reference for all purposes.

TECHNICAL FIELD

The disclosure relates generally to vehicle parts and, more particularly, to removable soft top.

BACKGROUND

Off-road vehicles (such as the JEEP® brand of vehicles) are a popular type of vehicle that owners often modify. Depending on the desires of the owners, the modifications can vary—from significant mechanical changes to minor aesthetic changes. FIGS. 1 and 2 show an example of such a vehicle, and FIGS. 3-6 depict an example of a soft top—a modification to the vehicle 100 of FIGS. 1 and 2.

As shown in FIGS. 1 and 2, the vehicle 100 (such as a 2018 JEEP® JKU) has a removable roof (not shown). Typically, the removable roof (not show) is sectioned (i.e., formed of several pieces) and is typically formed of fiberglass. When the roof (not shown) is removed, the underlying roll cage 102 is shown, which includes roof locks (not shown) to engage the removable roof. Typically, the roll cage 102 is comprised of a forward assembly 104, a speaker or central bar 106, a rear bar 108, driver-side bar 105, passenger-side bar 107, and rear posts 110.

The forward assembly 104 is positioned of above the windshield and secured to forward posts on each side of the windshield. Within the forward assembly 104, there is a windshield bar 116 that is secured to the windshield and forward posts. Above the windshield bar 116, there is an upper member 120 and lower member 118, which are separated from the windshield bar 116 by a gap 122. The upper and lower members 120 and 118 are generally designed to form a seal with the removable roof (not shown), and the removable roof (not shown) is dimensioned to fit into the gap 122. Also, included within the forward assembly 104 are roof anchors 114 (which are typically bolted to the windshield bar 116).

The driver-side bar 105 and passenger-side bar 107 will typically extend along most of the length of passenger cabin and are supported by forward posts in the front, center posts in the center and rear posts 110 in the back. Typically, these bars 105 and 107 are substantially parallel to on other with the front assembly 104, central bar 106, and rear bar 108 extending between them. Additionally, the central bar 106 typically includes roof locks (not shown) which engage the removable roof (not shown).

Turning to FIGS. 3 to 6, an example of a conventional soft top can be seen. Typically, the soft top 200 is a commonly referred to as a shade top, meaning that it blocks a portion of the sunlight incident on the vehicle 100 to provide shade to the occupants. This shade 200 is formed of a main body 202 (which is usually formed of two mesh fabric sheets). Commonly, these sheets that form the main body are formed of nylon. Along the forward edge of the top 200, there is a set of clip assemblies 204-1 to 204-3 (which are configured to engage roof anchors 114). These clips assemblies 204-1 to 204-3 are typically formed of a metal clip and strap sewn to the underside of the main body 202 (as shown in FIG. 6). Then along each elongated edge of the main body 202, there are a number of latch 206-1 to 206-7 assemblies which are generally designed to "wrap around" the bars 105 and 107. The latch assemblies 206-1 to 206-6 are generally formed of slide strap release with a strap that is typically sewn to the underside of the main body 202 with male and female receptacles that interlock in a manner similar to a child restraint in a common shopping cart.

Additionally, there is magnetic assembly 208 formed in the main body 202. Within the magnetic assembly shown 208, there are magnets 210-1 to 210-3 sewn in by way of pockets. The magnetic assembly 208 is positioned such that the magnets 210-1 to 210-3 engage the central bar 106 when the top 200 is secured to the vehicle 100.

This type of top, though, lacks the ability to remain in place while the removable roof is engaged and is limited to vehicles with roof anchors. Thus, there is a need for an improved soft top.

SUMMARY

An embodiment of the present disclosure, accordingly, provides an apparatus comprising: a main body having a forward edge, a rear edge, a first elongated edge, and a second elongated edge, wherein the first and second elongated edges extends between the forward edge and rear edge; a first reinforcement that is secured to the main body along at least a portion of the first elongated edge of the main body; a second reinforcement that is secured to the main body along at least a portion of the second elongated edge of the main body; a first set of latch assemblies that are each secured at along at least a portion of the first elongated edge of the of the main body; a second set of latch assemblies that are each secured at along at least a portion of the second elongated edge of the of the main body; a forward magnetic assembly that is formed along the forward edge of the main body, wherein the forward magnetic assembly includes: a third reinforcement that is secured to the main body along at least a portion of the forward edge; a first magnet that is secured to the main body along at least a portion of the forward edge of the main body, wherein the first magnet is positioned to be substantially adjacent to the third reinforcement, and wherein the first magnets is dimensioned such that first magnet, as secured to the main body, is configured to form an interference fit within a gap of a forward assembly of a vehicle; and a fourth reinforcement that is formed along at least a portion of the forward edge of the main body, wherein the fourth reinforcement is positioned to be substantially adjacent to the first magnet; a support assembly that is secured to the main body and spaced apart from the forward magnetic assembly, wherein the support assembly includes: a support member that is secured to the main body and that extends between the first and second elongated edges, wherein the support member has a first end and a second end; a first latch assembly from the first set of latch assemblies that is substantially aligned with the first end of the support member; and a first latch assembly from the second set of latch assemblies that is substantially aligned with the second end of the support member; a second magnet that is secured to the main body along the first elongated edge; and a third magnet that is secured to the main body along the second elongated edge.

In accordance with an embodiment of the present disclosure, the second magnet further comprises a first plurality of magnets that are spaced apart from one another along the first elongated edge, and wherein the third magnet further comprises a second plurality of magnets that are spaced apart from one another along the second elongated edge.

In accordance with an embodiment of the present disclosure, the first plurality of magnets are positioned to be substantially coextensive with the first reinforcement, and wherein the second plurality of magnets are positioned to be substantially coextensive with the second reinforcement.

In accordance with an embodiment of the present disclosure, the apparatus further comprises a port assembly that is substantially alighted with and spaced apart from the first and second pluralities of magnets, wherein the port assembly includes: a fifth reinforcement that is secured to the main body along the periphery of a port formed in the main body; and a fourth magnet that is secured to the main body along the periphery of the port formed in the main body and spaced apart from the fifth reinforcement.

In accordance with an embodiment of the present disclosure, each of the latch assemblies further comprises: a strap that is secured to the main body, wherein the strap has first and second ends; a female receptacle that is slidably secured to the first end of the strap; a male receptacle that is slidably secured to the second end of the strap, wherein the male and female receptacle are configured to interlock with one another.

In accordance with an embodiment of the present disclosure, the support assembly further comprises a fifth reinforcement that is secured to the main body and that is generally coextensive with the support member.

In accordance with an embodiment of the present disclosure, the support member is a steel rod.

In accordance with an embodiment of the present disclosure, the first and second reinforcements are straps sewn to the main body along at least a portion of the first and second elongated edges.

In accordance with an embodiment of the present disclosure, the third reinforcement is a guard, wherein the guard is a solid plastic body.

In accordance with an embodiment of the present disclosure, a soft top is provided. The soft top that is configured to attach to a roll cage of a vehicle having a forward assembly with a gap, a central bar, a rear bar, a passenger-side bar, and a driver-side bar, the soft top comprising: a main body having: a top side that is configured to face the exterior of the vehicle; a bottom side that is configured to face the interior of the vehicle; a forward edge that is configured to be aligned with the forward assembly of the roll cage of the vehicle; a rear edge that configured to be aligned with the rear bar of the roll cage of the vehicle, wherein the forward edge is substantially parallel to the rear edge; a first elongated edge that extends between the forward edge and rear edge and that is configured to be aligned with the driver-side bar of the roll cage of the vehicle; a second elongated edge that extends between the forward edge and rear edge and that is configured to be aligned with the driver-side bar of the roll cage of the vehicle, wherein the first elongated edge is substantially parallel to the second elongated edge; a first strap that is sewn to the top side of the main body along at least a portion of the periphery of the main body along the first elongated edge; a second strap that is sewn to the top side of the main body along at least a portion of the periphery of the main body along the second elongated edge; a plurality of pads sewn to bottom side the main body along the periphery of the main body, wherein the pads are spaced apart from one another; a first set of latch assemblies that are each sewn to the bottom side of the main body along at least a portion periphery of the main body at the first elongated edge of the of the main body, wherein the first set of latch assemblies is configured to be secured the soft top to the driver-side bar; a second set of latch assemblies that are each sewn to the bottom side of the main body along at least a portion periphery of the main body at the second elongated edge of the of the main body, wherein the second set of latch assemblies is configured to be secured the soft top to the passenger-side bar; a second set of latch assemblies that are each sewn at along at least a portion of the second elongated edge of the of the main body; a forward magnetic assembly that is formed along the forward edge of the main body, wherein the forward magnetic assembly includes: a guard that is sewn to the top side of the main body along the periphery of the main body at the forward edge of the main body; a first set of magnets, wherein each magnet from the first set of magnets is sewn to the main body along at least a portion of the forward edge of the main body, and wherein the magnets from the first set of magnets are spaced apart from one another, and wherein each magnet from the first set of magnets is positioned to be substantially adjacent to the guard, and wherein each magnet from the first set of magnets is dimensioned such that first magnet, as sewn to the main body, is configured to form an interference fit within the gap of the forward assembly of a vehicle, and wherein the first set of magnets is configured to magnetically engage the forward assembly of the roll cage; and a third strap that is sewn to the top side of the main body along at least a portion of the forward edge of the main body, wherein the fourth reinforcement is positioned to be substantially adjacent to the first set of magnets; a support assembly that is secured to the main body and spaced apart from the forward magnetic assembly, wherein the support assembly includes: a support member that is sewn to the main body and that extends between the first and second elongated edges, wherein the support member has a first end and a second end; a first latch assembly from the first set of latch assemblies that is substantially aligned with the first end of the support member; and a first latch assembly from the second set of latch assemblies that is substantially aligned with the second end of the support member; a second set of magnets, wherein each magnet from the second set of magnets is sewn to the main body along the first elongated edge, wherein the second set of magnets is configure to magnetically engage the driver-side bar and is configured to be aligned with a first end of the central bar of the roll cage of the vehicle; and a third set of magnets, wherein each magnet from the third set of magnets is secured to the main body along the second elongated edge, wherein the third set of magnets is configure to magnetically engage the driver-side bar and is configured to be aligned with a second end of the central bar of the roll cage of the vehicle.

In accordance with an embodiment of the present disclosure, the second set of magnets are positioned to be substantially coextensive with the first strap, and wherein the third set of magnets are positioned to be substantially coextensive with the second strap.

In accordance with an embodiment of the present disclosure, the apparatus further comprises a port assembly that is substantially alighted with and spaced apart from the first and second pluralities of magnets, wherein the port assembly includes: a fourth strap that is sewn to the top side of the main body along the periphery of a port formed in the main body, wherein the port is configured to be aligned with a roof lock positioned within the central bar of the roll cage of the vehicle; and a port magnet that is sewn to the main body along the periphery of the port formed in the main body and spaced apart from the fourth strap.

In accordance with an embodiment of the present disclosure, the support assembly further comprises a fifth strap that is sewn to the top side of the main body and that is generally coextensive with the support member.

In accordance with an embodiment of the present disclosure, each magnet and the support member are sewn to the main body by way of a pocket.

In accordance with an embodiment of the present disclosure, the guard is a solid plastic body, and wherein each strap is formed of nylon, and wherein the main body is at least partially transparent to sunlight.

In accordance with an embodiment of the present disclosure, a method is provided. The method for securing a soft top to a vehicle, wherein the vehicle includes a roll cage of a vehicle having a forward assembly with a gap, a central bar, a rear bar, a passenger-side bar, and a driver-side bar, and wherein the soft top includes: a main body having a forward edge, a rear edge, a first elongated edge, and a second elongated edge, wherein the first and second elongated edges extends between the forward edge and rear edge; a first reinforcement that is secured to the main body along at least a portion of the first elongated edge of the main body; a second reinforcement that is secured to the main body along at least a portion of the second elongated edge of the main body; a first set of latch assemblies that are each secured at along at least a portion of the first elongated edge of the of the main body; a second set of latch assemblies that are each secured at along at least a portion of the second elongated edge of the of the main body; a forward magnetic assembly that is formed along the forward edge of the main body, wherein the forward magnetic assembly includes: a third reinforcement that is secured to the main body along at least a portion of the forward edge; a first magnet that is secured to the main body along at least a portion of the forward edge of the main body, wherein the first magnet is positioned to be substantially adjacent to the third reinforcement, and wherein the first magnets is dimensioned such that first magnet, as secured to the main body, is configured to form an interference fit within a gap of a forward assembly of a vehicle; and a fourth reinforcement that is formed along at least a portion of the forward edge of the main body, wherein the fourth reinforcement is positioned to be substantially adjacent to the first magnet; a support assembly that is secured to the main body and spaced apart from the forward magnetic assembly, wherein the support assembly includes: a support member that is secured to the main body and that extends between the first and second elongated edges, wherein the support member has a first end and a second end; a first latch assembly from the first set of latch assemblies that is substantially aligned with the first end of the support member; and a first latch assembly from the second set of latch assemblies that is substantially aligned with the second end of the support member; a second magnet that is secured to the main body along the first elongated edge; and a third magnet that is secured to the main body along the second elongated edge, the method comprising: positioning the soft top over the top of the roll cage of the vehicle; securing each latch assembly from the first and second sets of latch assemblies to the respective diver-side and passenger-side bars; and inserting the forward magnetic assembly into the gap of the forward assembly of the roll cage of the vehicle such that the forward assembly is magnetically and frictionally engaged with the first magnet.

In accordance with an embodiment of the present disclosure, the soft top includes a port assembly that is substantially alighted with and spaced apart from the first and second pluralities of magnets, wherein the port assembly includes: a fifth reinforcement that is secured to the main body along the periphery of a port formed in the main body; and a fourth magnet that is secured to the main body along the periphery of the port formed in the main body and spaced apart from the fifth reinforcement, and wherein the method further comprises attaching at least a portion of a removable roof the vehicle such that it engages a roof lock through the port in the main body.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
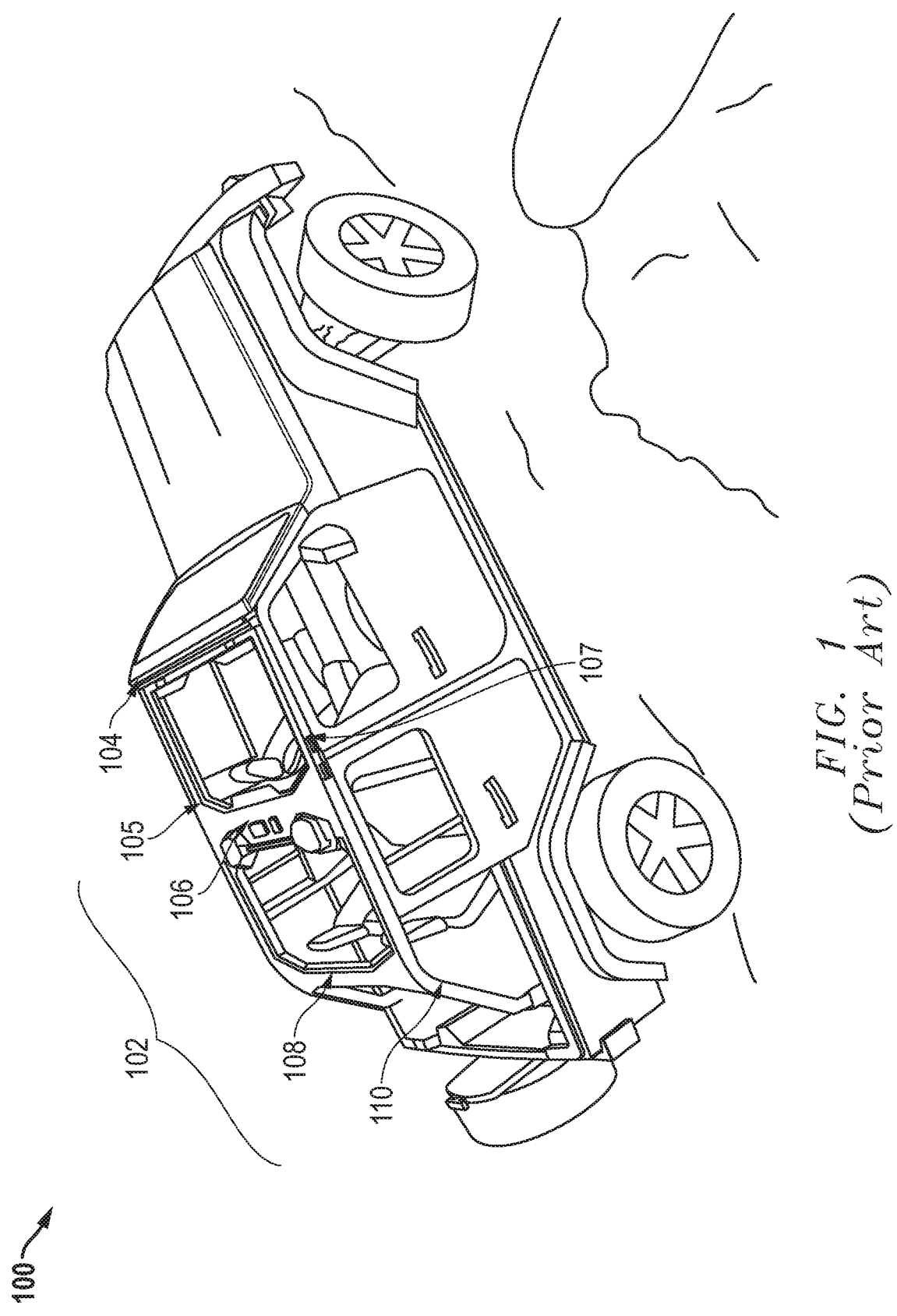
FIGS. 1 and 2 are depictions of examples of a conventional vehicle with a removed top.
Figure 2:
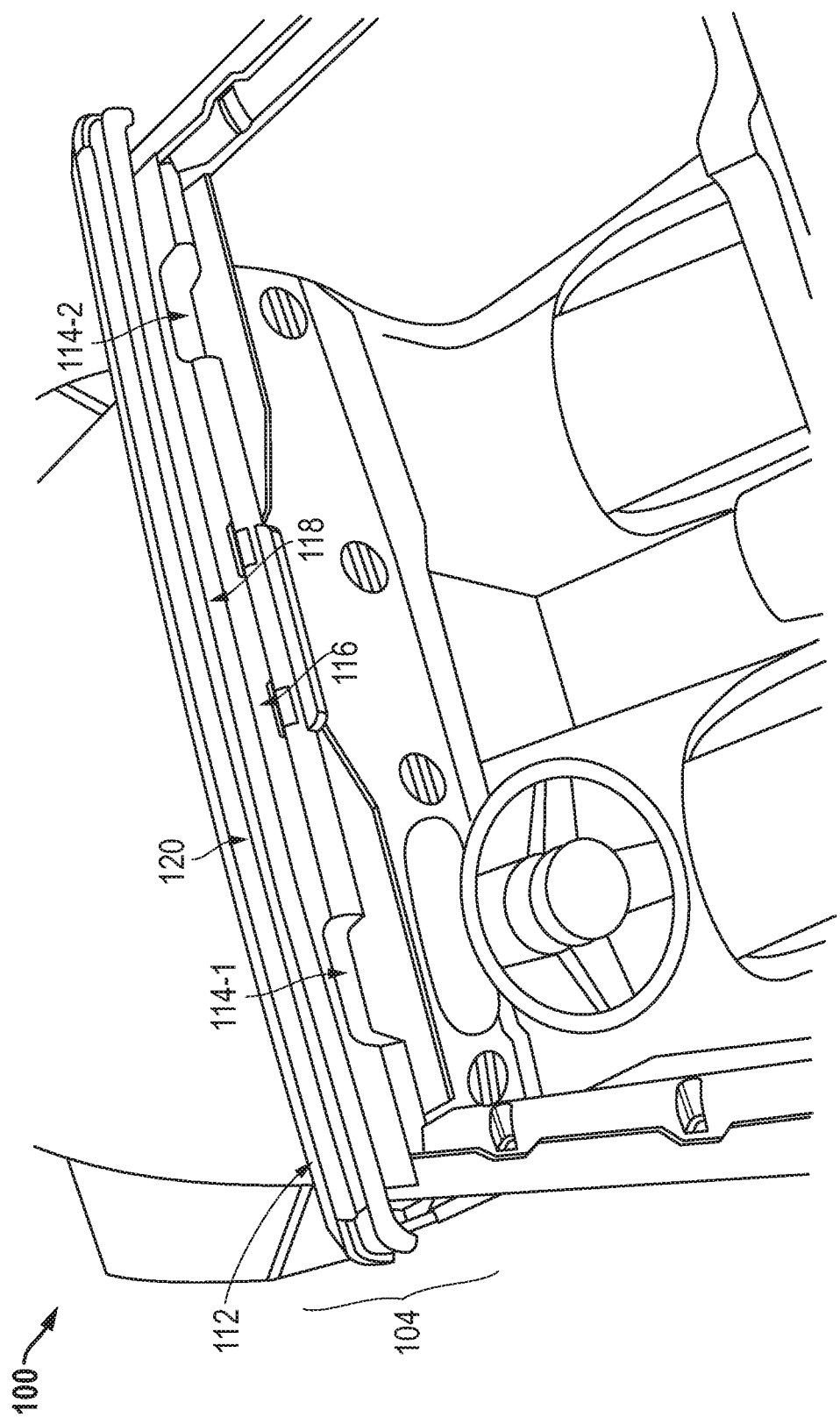
Figure 3:
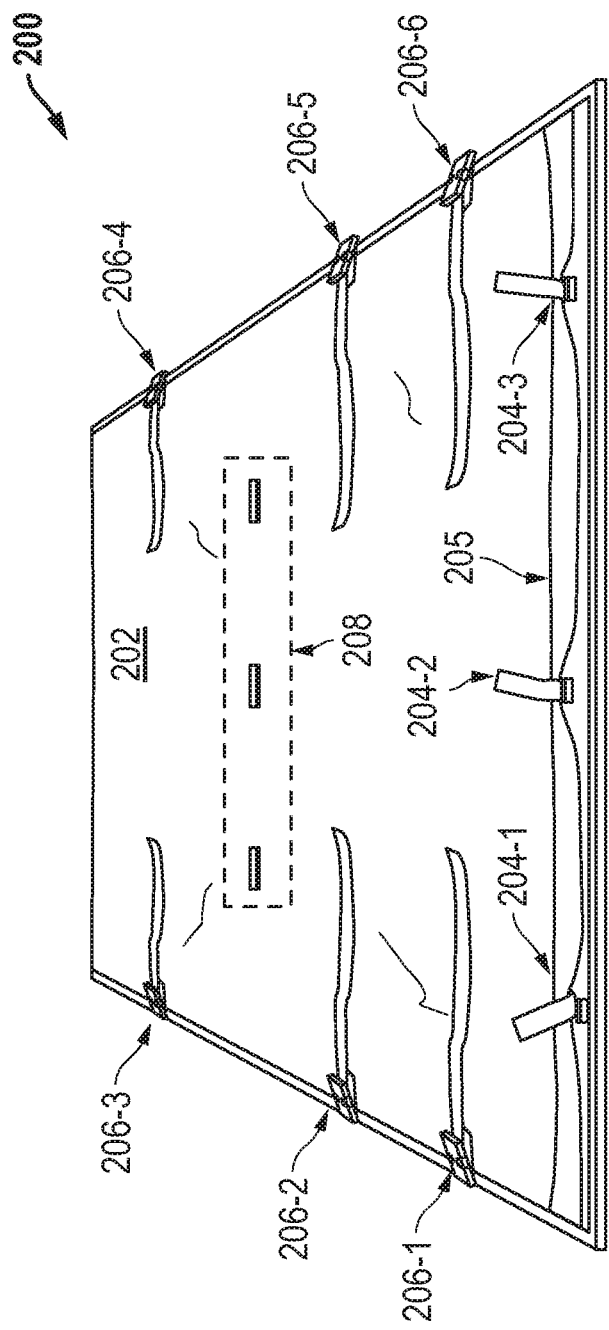
FIG. 3 depicts the underside of a conventional soft top that is configured to engage the vehicle shown in FIGS. 1 and 2.
Figure 4:
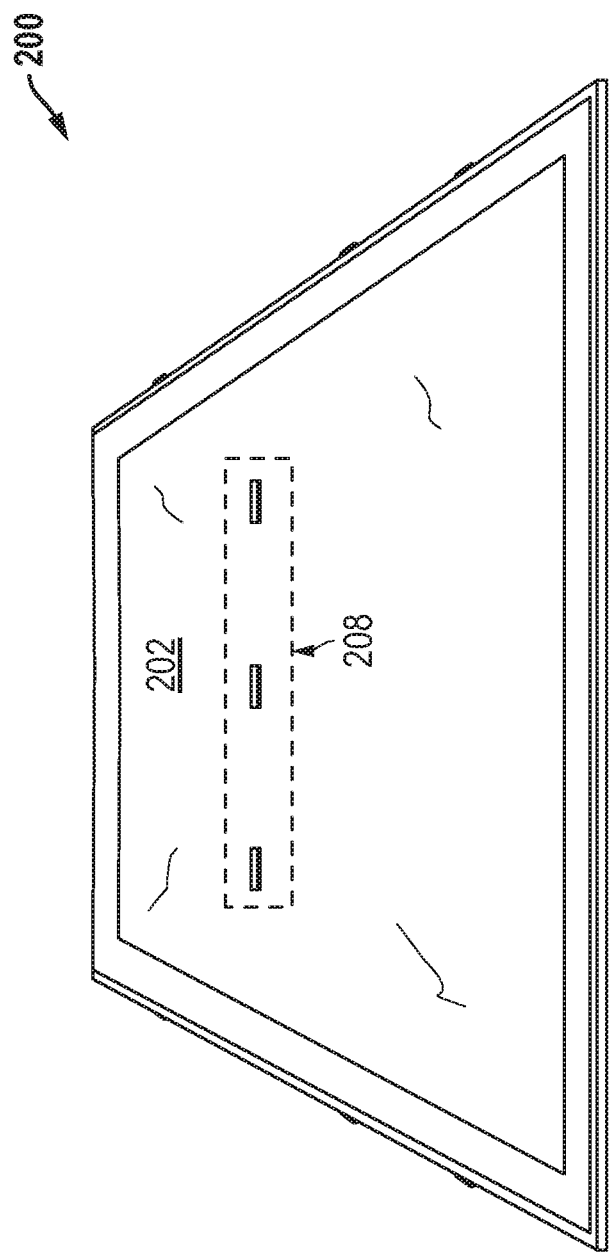
FIG. 4 depicts the magnetic assembly of the soft top of FIGS. 3 and 5.
Figure 5:
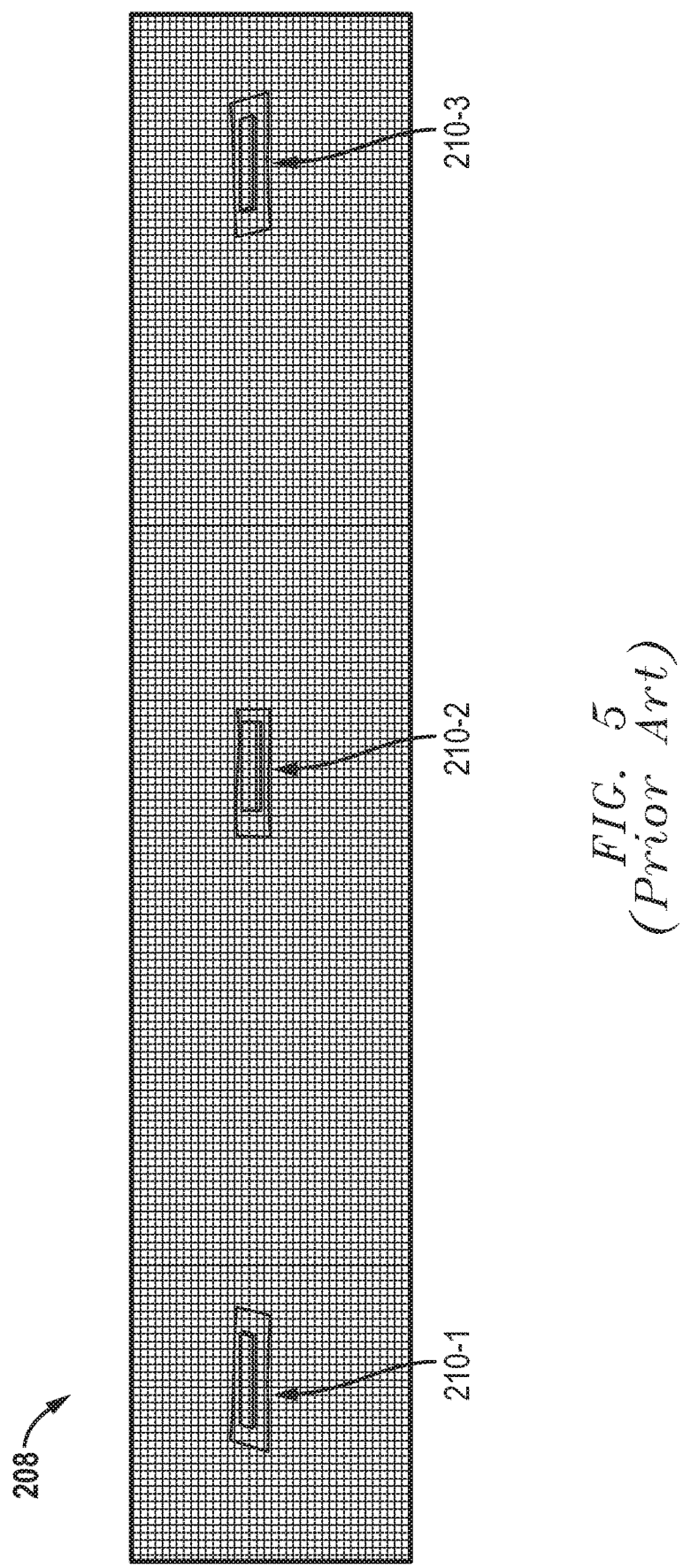
FIG. 5 depicts a portion of the top side of the soft top of FIGS. 3 and 4.
Figure 6:
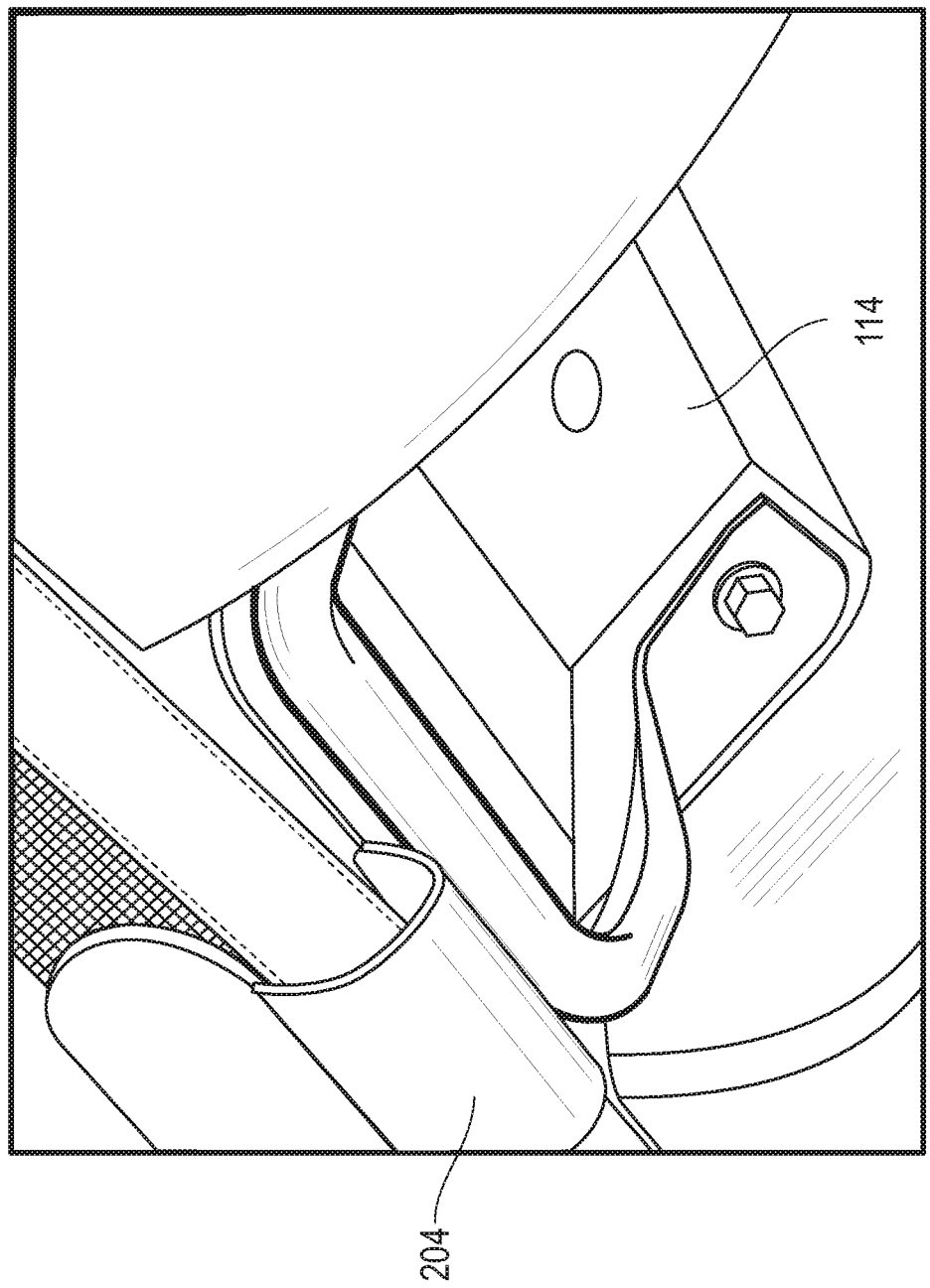
FIG. 6 depicts the manner in which the clip assembly of the soft top of FIGS. 3 and 4 engages the roof anchor of the vehicle of FIGS. 1 and 2.
Figure 7:
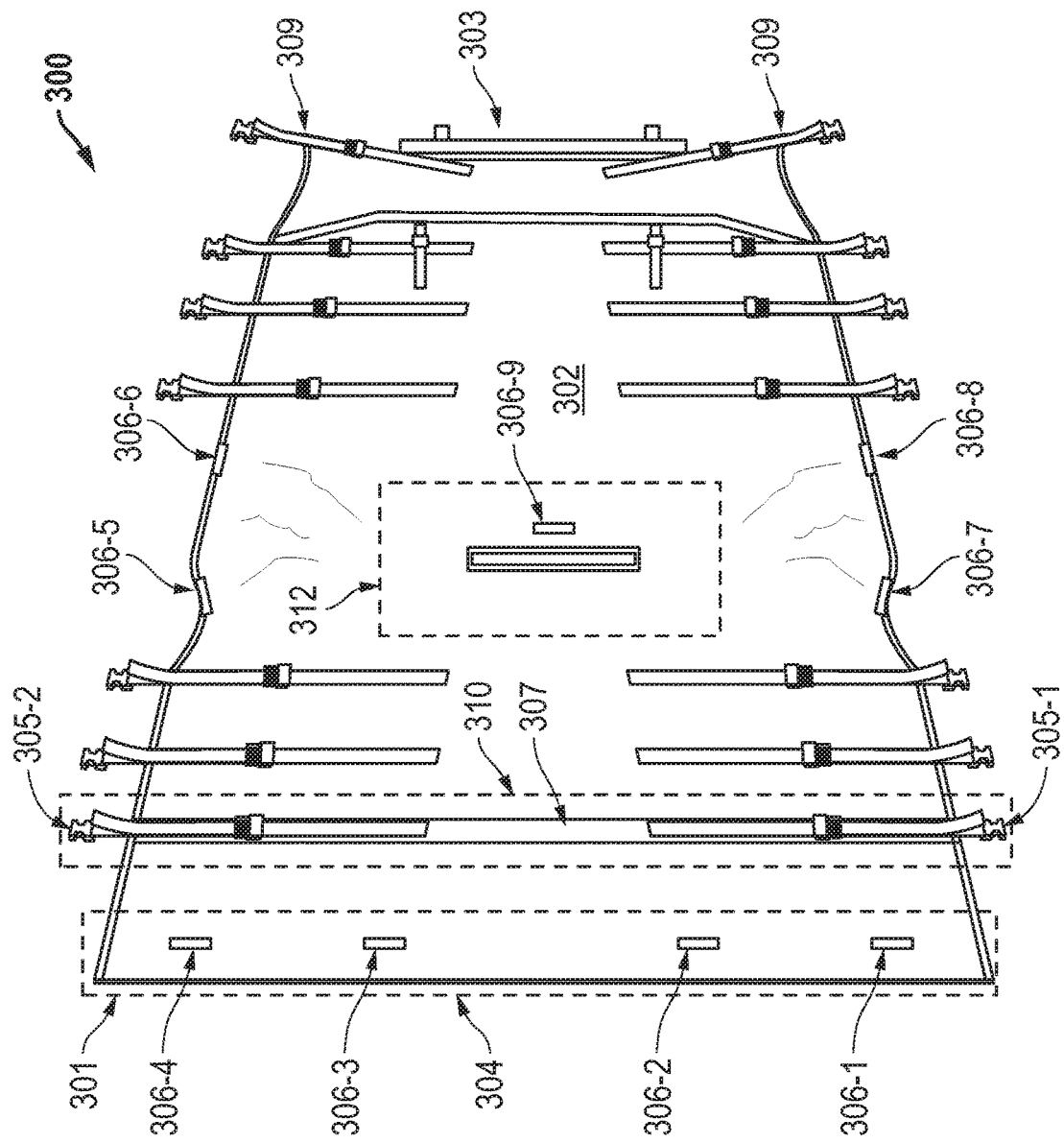
FIG. 7 depicts an example of underside of a magnetic soft top.
Figure 8:
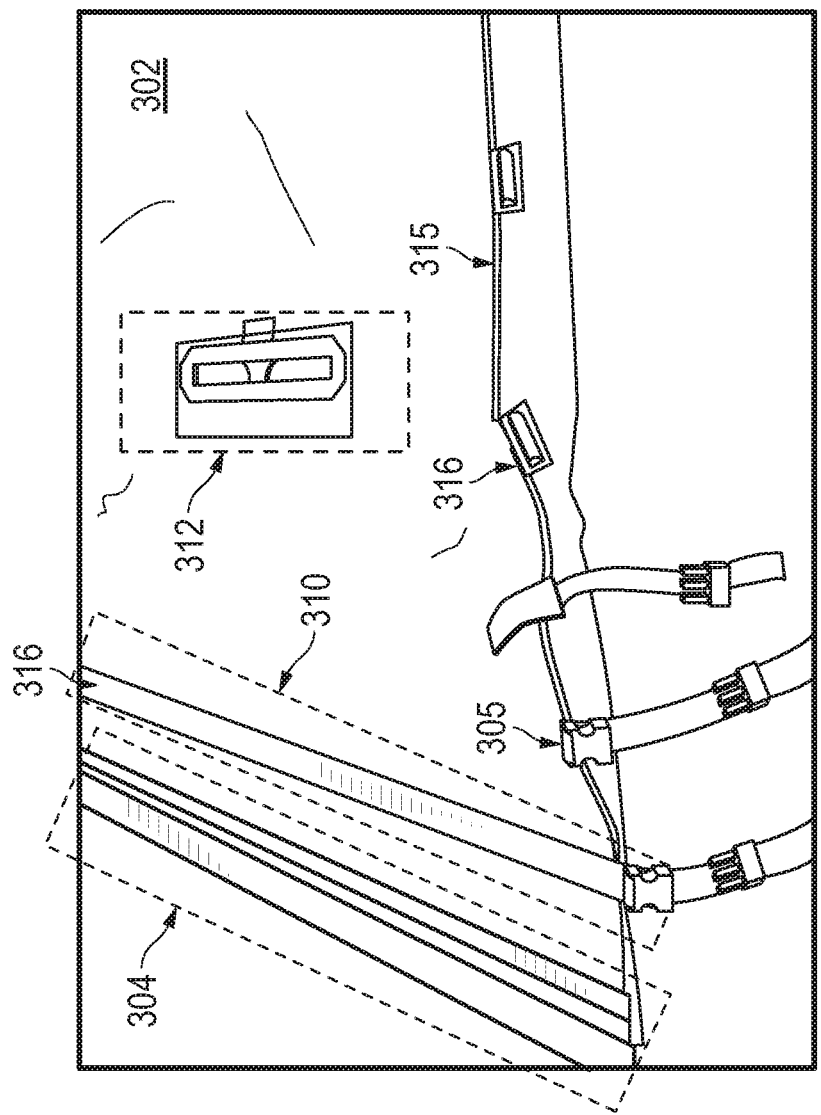
FIGS. 8, 10, and 11 depict portions of top side of the magnetic soft top of FIG. 7.

Refer now to the drawings wherein depicted elements are, for the sake of clarity, not necessarily shown to scale and wherein like or similar elements are designated by the same reference numeral through the several views.

Turning to FIGS. 7-11, a magnetic soft top 300 can be seen. The magnetic soft top 300 is generally form of a main body 302. The main body 302 is typically formed of multiple layers of fabric that are seamed or sewn together. The main body 302 may, for example, for a shade top where the fabric (which can, for example, be nylon) are layers of mesh. As shown in this example, the main body 302 is generally rectangular with four edges: forward 301, rear 303, and two elongated 309. Each of these edges 301, 303, and 309 is typically reinforced to prevent fraying. As shown in this example, the reinforcement for each of the elongated edges 309 is a strap 315 (which can be formed of nylon). Again, in this example, straps 315 are sewn over the edges and extend over the length of the elongated edges 309. It is possible to use other reinforcements (such as rigid plastics) and position them away from the edges.

Along the forward edge 301, there is a magnetic assembly 304. As shown in this example, the magnetic assembly 304 includes a reinforcement made of guard 314 formed a rigid plastic body. It is also possible to form it of other materials. It is, however, desirable to use a rigid body because the forward assembly is dimensioned to be inserted into the gap of a forward assembly of a roll cage (e.g., gap 122). Typically positioned behind the guard 314 are magnets 306-1 to 306-4 and spaced apart from one another to form, in part, the magnetic assembly 304. The magnets 306-1 to 306-4 may, for example, be neodymium magnetics and may have a strength of about 0.5 T. In this example, the magnets 306-1 to 306-4 are sewn to the main body 302 by way of pockets, but there are a variety of other ways to secure the magnets 306-1 to 306-4 (such as gluing or directly sewing). The magnets 306-1 to 306-4 have a thickness, and, as shown in this example, the magnets 306-1 to 306-4, when secured (sewn in pockets as shown) to the main body 302, are dimensioned to form an interference fit with the gap of a forward assembly of a roll cage (e.g., gap 122). Behind the magnets 306-1 to 306-4, there is (as shown in this example) a reinforcement. The reinforcement behind the magnets 306-1 to 306-4 in this example is shown to be a strap 308 (e.g., made of nylon) sewn to the main body 302 and extending between the elongated sides 309. Other materials and means of securing (e.g., gluing) may be used for this reinforcement.

Figure 9:
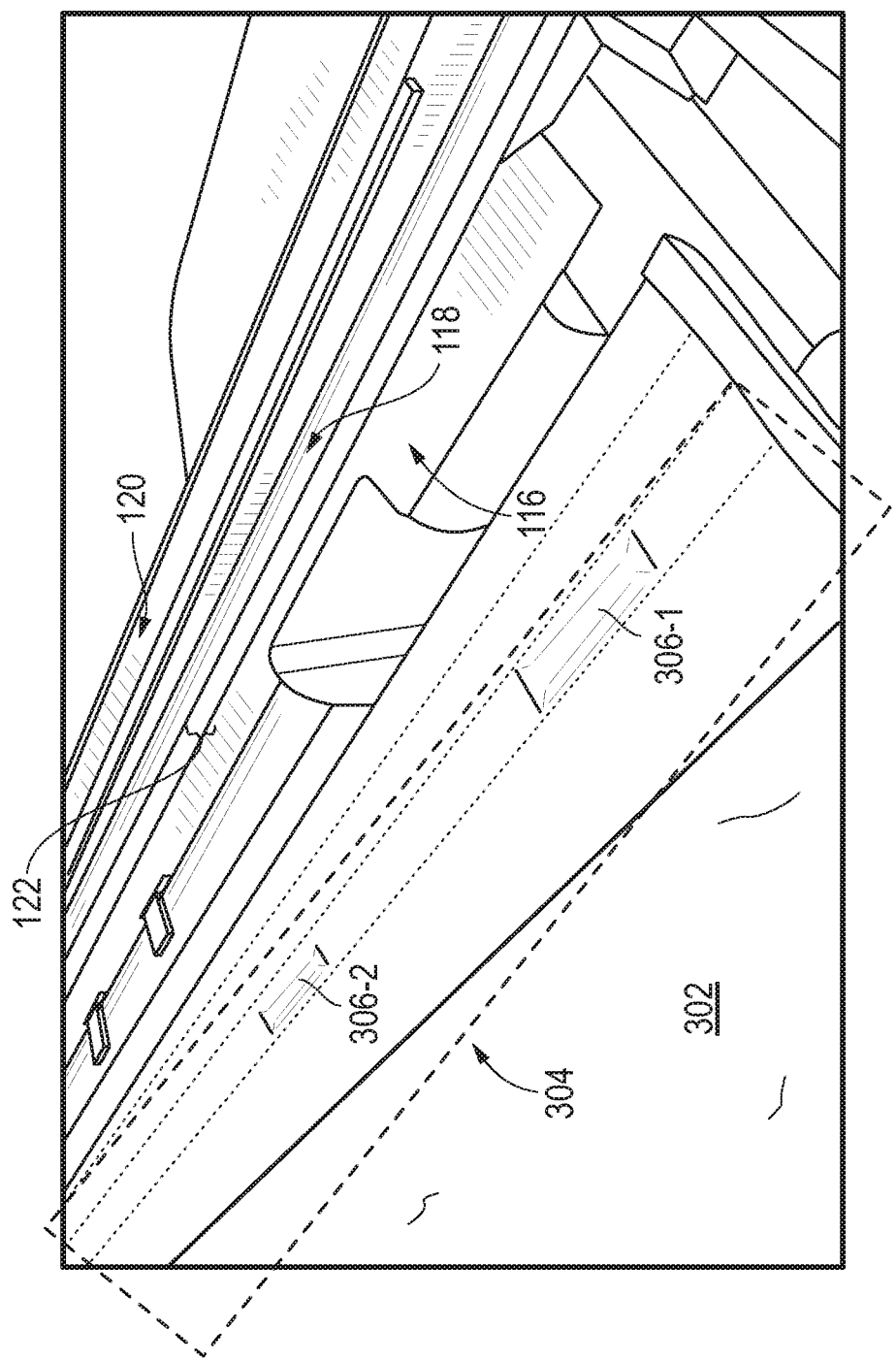
FIG. 9 depicts an example of a portion of the magnetic soft top of FIG. 7 engaging a vehicle.
Figure 10:
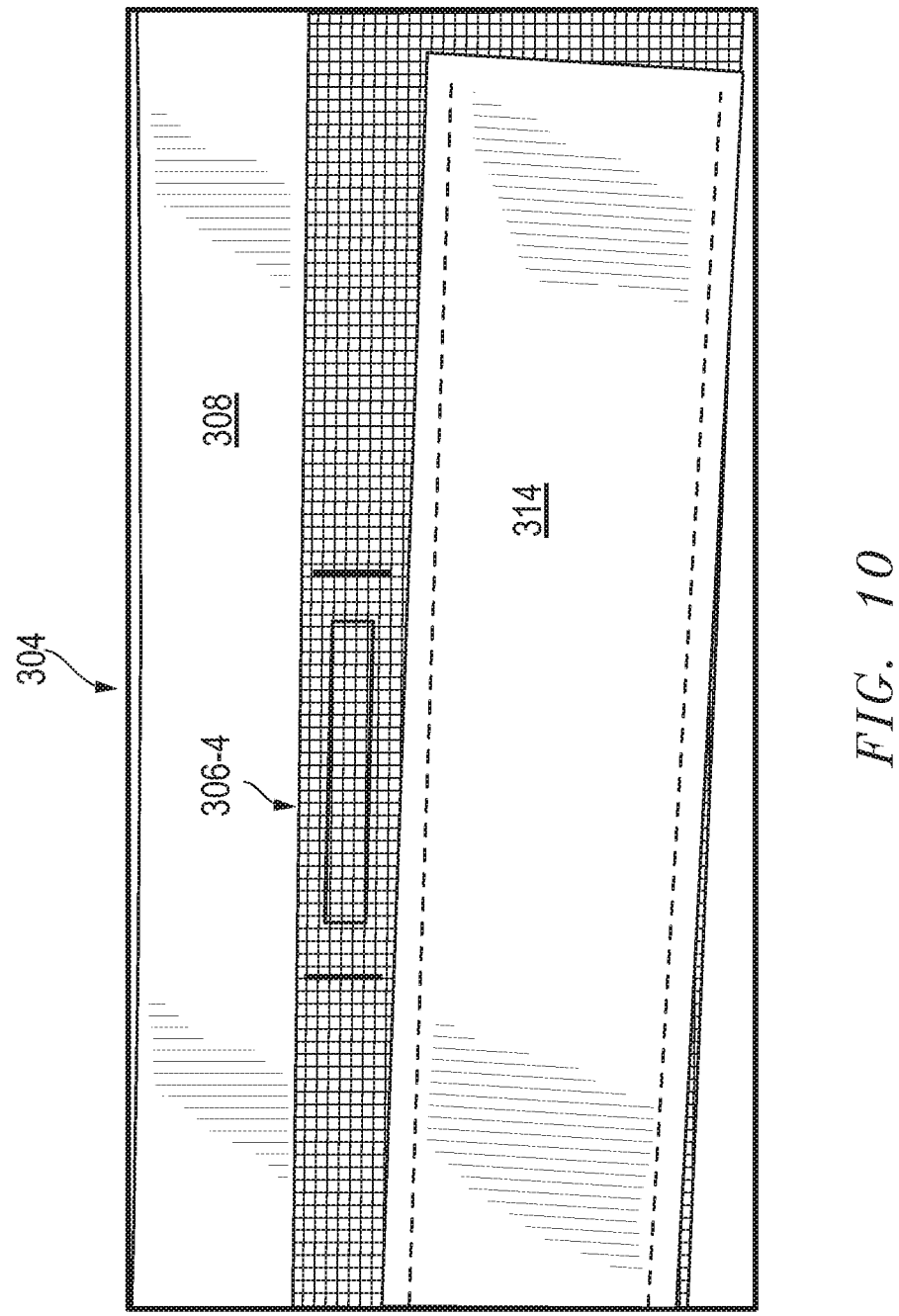

Behind and spaced away from the forward assembly 304 is a support assembly 310 in the example shown. The assembly 310 is, for example, formed of a support member (e.g., steel rod 307) sewn to the main body 302 by way of a pocket, a reinforcement, and latches 305-1 and 305-2. The reinforcement in this example is shown to be a strap 308 (e.g., made of nylon) sewn to the main body 302 and extending between the elongated sides 309. Other materials and means of securing (e.g., gluing) may be used for this reinforcement. The latches 305-1 and 305-2 are, for example, similar to the latches depicted with the conventional top 200. When this support assembly 310 is secured to roll cage of a vehicle (e.g., 102), it can allow forward assembly to be removed from the gap (e.g., gap 122) and folded back (as shown in FIG. 9). Because the forward assembly of the roll cage is exposed, a removable roof can be secured to the vehicle without removing the soft top 300. There can also be other latches (e.g., 305-1) along the elongated edges 309 (e.g., sewn to the body 302) so that they may "wrap around" the driver-side and passenger-side bars (e.g., 105 and 107) and pulled tight. There can also be pads 316 positioned (e.g., sewn to) the underside of the may body 302 to provide a barrier between the top and vehicle to prevent scratching.

Additionally, there is a center assembly (which helps prevent buffeting highway speeds as well as other benefits). The center assembly is generally formed of magnets 306-5 to 306-8 and a port assembly 312. The magnets 306-5 to 306-8 are generally positioned along the elongated edges 309 to be located with or generally coextensive with the reinforcements. As with the other magnets (e.g., 306-1), the magnets 306-5 to 306-8 are sewn by way of pockets, but may be secured in other manners as the other magnets (e.g., 306-1). Additionally, magnets 306-5 to 306-8 may be made of the same materials as the other magnets (e.g., 306-1). These magnets 306-5 to 306-8 are typically positioned to magnetically engage with diver-side and passenger side bars (e.g., 105 and 107) and be aligned with the central bar (e.g., 106).

Figure 11:
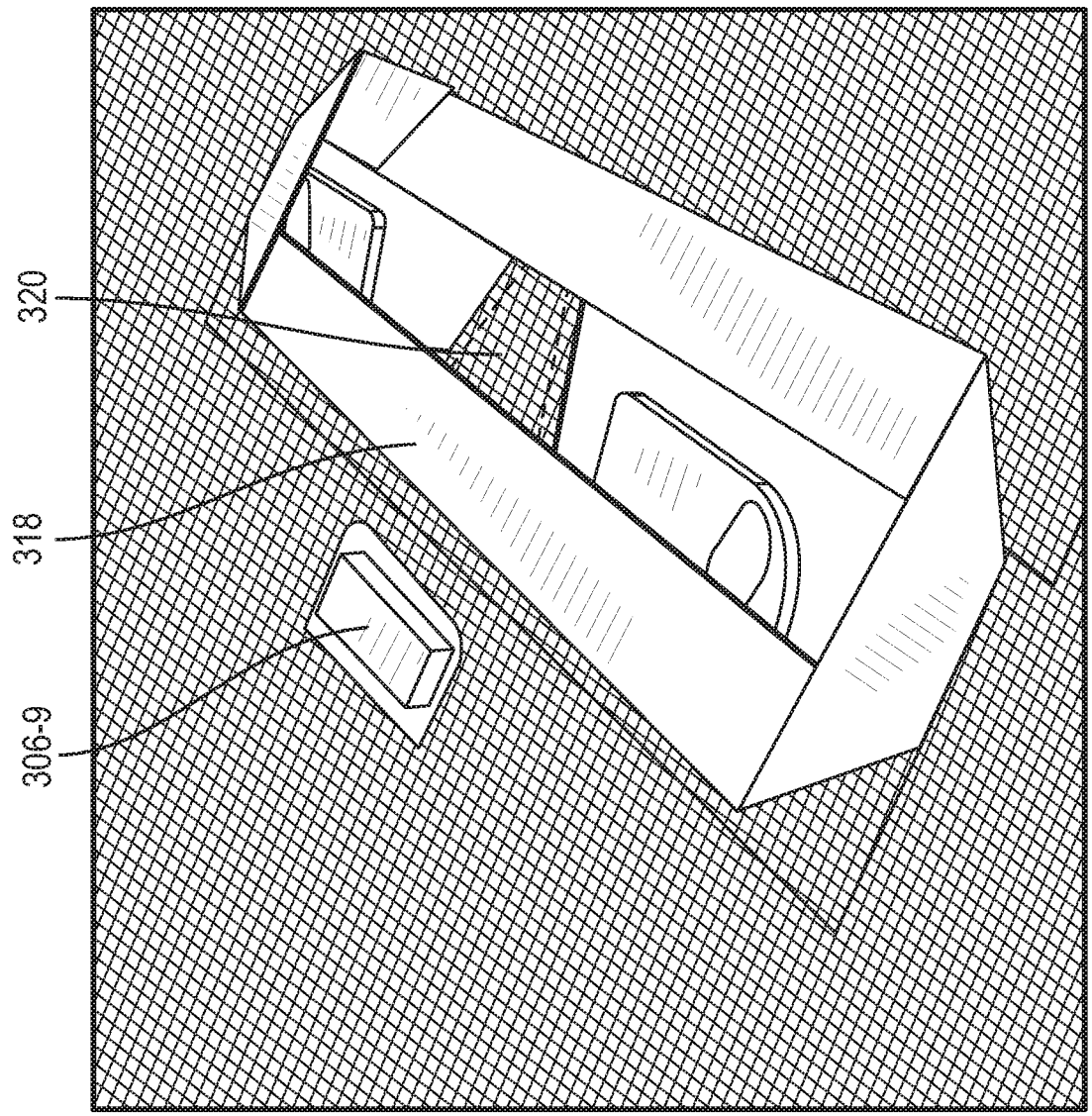

The port assembly 312 is generally positioned to be aligned with the magnets 306-5 to 306-8 and be positioned over a be aligned with a roof lock (as shown in FIG. 11). As shown, there is a port or portal formed in the main body 302 that is configured to expose the roof lock in the central bar (e.g., 106) to be exposed. This, like the support assembly 310, allows removable roof to be engaged without removing the top 300. Around the periphery of the port or portal is a reinforcement (e.g., strap 318 that may be sewn to the main body 302). This reinforcement may be formed of the same material as other straps described above. The port assembly 312 may also include a magnet 306-9 (which, as depicted, may be sewn to the main body 302 by way of a pocket). This magnetic 306-9 can be positioned to along the periphery (adjacent to or spaced away from the reinforcement) so that it can magnetically engage the central bar (e.g., 106). It may also be formed of the same materials as the other magnets (e.g., 306-1) or be secured in a different way (e.g., directly sewn or glued). The port assembly 312 may also include a divider 320 that extend across the portal or port.

No term is intended to be construed in accordance with 35 U.S.C. 112(f) unless such term recites the word "means."

Having thus described the present disclosure by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present disclosure may be employed without a corresponding use of the other features. Accordingly, it is appropriate that the appended claims be construed broadly.

The invention claimed is:

1. An apparatus comprising:
 a main body having a forward edge, a rear edge, a first elongated edge, and a second elongated edge, wherein the first and second elongated edges extends between the forward edge and rear edge;
 a first magnet that is secured to the main body along at least a portion of the forward edge of the main body, wherein the first magnet is dimensioned such that the first magnet, as secured to the main body, is configured to form an interference fit within a gap of a forward assembly of a vehicle; and
 a support assembly that is secured to the main body and spaced apart from the first magnetic, wherein the support assembly includes:
  a support member that is secured to the main body and that extends between the first and second elongated edges, wherein the support member has a first end and a second end;
  a first latch assembly from the first set of latch assemblies that is substantially aligned with the first end of the support member; and
  a first latch assembly from the second set of latch assemblies that is substantially aligned with the second end of the support member;
 a second magnet that is secured to the main body along the first elongated edge; and
 a third magnet that is secured to the main body along the second elongated edge.

2. The apparatus of claim 1, wherein the first magnet further comprises a plurality of magnets.

3. The apparatus of claim 1, wherein the second magnet further comprises a first plurality of magnets that are spaced apart from one another along the first elongated edge, and wherein the third magnet further comprises a second plurality of magnets that are spaced apart from one another along the second elongated edge.

4. The apparatus of claim 3, wherein the first plurality of magnets are positioned to be substantially coextensive with the first reinforcement, and wherein the second plurality of magnets are positioned to be substantially coextensive with the second reinforcement.

5. The apparatus of claim 1, wherein the apparatus further comprises a port assembly that is substantially aligned with and spaced apart from the second and third magnets, wherein the port assembly includes:
   a reinforcement that is secured to the main body; and
   a fourth magnet that is secured to the main body.

6. The apparatus of claim 1, where the apparatus further comprises a plurality of latch assemblies secured along at least a portion of the first and second elongated edges, wherein each of the latch assemblies further comprises:
   a strap that is secured to the main body, wherein the strap has first and second ends;
   a female receptacle that is slidably secured to the first end of the strap;
   a male receptacle that is slidably secured to the second end of the strap, wherein the male and female receptacle are configured to interlock with one another.

7. The apparatus of claim 1, wherein the support member is a steel rod.

8. The apparatus of claim 1, wherein the apparatus further comprises a plurality of reinforcements formed along at least a portion of the first and second elongated edges.

9. A soft top that is configured to attach to a roll cage of a vehicle having a forward assembly with a gap, a central bar, a rear bar, a passenger-side bar, and a driver-side bar, the soft top comprising:
   a main body having:
      a top side that is configured to face the exterior of the vehicle;
      a bottom side that is configured to face the interior of the vehicle
      a forward edge that is configured to be aligned with the forward assembly of the roll cage of the vehicle;
      a rear edge that configured to be aligned with the rear bar of the roll cage of the vehicle, wherein the forward edge is substantially parallel to the rear edge;
      a first elongated edge that extends between the forward edge and rear edge and that is configured to be aligned with the driver-side bar of the roll cage of the vehicle;
      a second elongated edge that extends between the forward edge and rear edge and that is configured to be aligned with the driver-side bar of the roll cage of the vehicle, wherein the first elongated edge is substantially parallel to the second elongated edge;
   a first magnet that is secured to the main body along at least a portion of the forward edge of the main body, wherein the first magnet is dimensioned such that the first magnet, as secured to the main body, is configured to form an interference fit within a gap of a forward assembly of a vehicle;
   a support assembly that is secured to the main body and spaced apart from the first magnetic, wherein the support assembly includes:
      a support member that is sewn to the main body and that extends between the first and second elongated edges, wherein the support member has a first end and a second end;
      a first latch assembly from the first set of latch assemblies that is substantially aligned with the first end of the support member; and
      a first latch assembly from the second set of latch assemblies that is substantially aligned with the second end of the support member;
   a second magnet that is secured to the main body along at least a portion of the first elongated edge; and
   a third magnet that is secured to the main body along at least a portion of the second elongated edge.

10. The apparatus of claim 9, wherein the first magnet further comprises a plurality of magnets.

11. The apparatus of claim 9, wherein the second magnet further comprises a first plurality of magnets that are spaced apart from one another along the first elongated edge, and wherein the third magnet further comprises a second plurality of magnets that are spaced apart from one another along the second elongated edge.

12. The apparatus of claim 11, wherein the first plurality of magnets are positioned to be substantially coextensive with the first reinforcement, and wherein the second plurality of magnets are positioned to be substantially coextensive with the second reinforcement.

13. The apparatus of claim 9, wherein the apparatus further comprises a port assembly that is substantially aligned with and spaced apart from the second and third magnets, wherein the port assembly includes:
   a reinforcement that is secured to the main body; and
   a fourth magnet that is secured to the main body.

14. The apparatus of claim 9, where the apparatus further comprises a plurality of latch assemblies secured along at least a portion of the first and second elongated edges, wherein each of the latch assemblies further comprises:
   a strap that is secured to the main body, wherein the strap has first and second ends;
   a female receptacle that is slidably secured to the first end of the strap;
   a male receptacle that is slidably secured to the second end of the strap, wherein the male and female receptacle are configured to interlock with one another.

15. The apparatus of claim 9, wherein the support member is a steel rod.

16. The apparatus of claim 9, wherein the apparatus further comprises a plurality of reinforcements formed along at least a portion of the first and second elongated edges.

17. The apparatus of claim 9, wherein each magnet is sewn to the main body by way of a pocket.

18. The apparatus of claim 9, wherein the main body is at least partially transparent to sunlight.

* * * * *